United States Patent [19]

Stoll

[11] Patent Number: 4,632,352
[45] Date of Patent: Dec. 30, 1986

[54] MOUNT FOR A PROXIMITY SENSOR

[76] Inventor: Kurt Stoll, Lenzhalde 72, 7300 Esslingen, Fed. Rep. of Germany

[21] Appl. No.: 677,801

[22] Filed: Dec. 4, 1984

[30] Foreign Application Priority Data

Dec. 6, 1983 [DE] Fed. Rep. of Germany ....... 3344010

[51] Int. Cl.$^4$ .......................................... H03K 17/945
[52] U.S. Cl. ................................. 248/313; 248/316.6; 248/DIG. 4
[58] Field of Search ..................... 248/309.1, 558, 544, 248/359 F, 313, 316.1, DIG. 4, 316.6, 314, 316.4, 311.2, 542, 543, 27.1, 309.2; 403/344, 312

[56] References Cited

U.S. PATENT DOCUMENTS

| | | | |
|---|---|---|---|
| 2,280,437 | 4/1942 | Levesque | 248/DIG. 4 |
| 2,877,975 | 3/1959 | Schnee | 248/316.1 |
| 2,899,220 | 8/1959 | Abrams | 248/27.1 |
| 3,235,208 | 2/1966 | Root | 248/27.1 |
| 4,303,054 | 12/1981 | Lore | 248/DIG. 4 |
| 4,367,858 | 1/1983 | Ziaylek | 248/314 |
| 4,411,449 | 10/1983 | Takada | 403/312 |

FOREIGN PATENT DOCUMENTS 6914317 3/1971 Fed. Rep. of Germany .

Primary Examiner—Reinaldo P. Machado
Assistant Examiner—Alvin Chin-Shue
Attorney, Agent, or Firm—McGlew and Tuttle

[57] ABSTRACT

A mount for a proximity sensor with a cylindrical housing having a male thread thereon, is made up of two gripping jaws and a longitudinally slitted bush able to be gripped by the jaws and able to have the proximity sensor screwed into it. The bush has the form of a screw. Its threaded shank is taken up in recesses in the gripping jaws, that have mating female threads therefor. The bush is moved in steps for coarse adjustment of the sensor with the gripping jaws slackened off and for fine adjustment is its screwed along on the gripping jaws after the same have been closed somewhat but not tightened. On doing up the gripping jaws tightly the bush is locked and jammed and the sensor within it also locked.

10 Claims, 3 Drawing Figures

MOUNT FOR A PROXIMITY SENSOR

BACKGROUND OF THE INVENTION

The present invention relates to mounts for proximity sensors and more specially though not exclusively to such a mount having a cylindrical housing with a male thread on its outer face.

Proximity sensors are used to detect the position of one part in relation to another part without making physical contact. For example, use may be made of electromagnetic sensors in the form of inductive or capacitive proximity switches, that respond to metal members near the detection element of the sensor. For such proximity switches, the design may be in the form of a cylinder, see for example the Standard 50008 D.

For mounting a proximity sensor and for adjustment of its switching point, the sensor is normally screwed into a suitable threaded hole. Its adjustment in the axial direction is undertaken exclusively by a screwing motion. When the final or desired position of the proximity sensor has been reached, in which it gives the desired switching function, the proximity sensor is locked in place by a lock nut on its outer screw thread.

This way of mounting a proximity sensor has a number of shortcomings. The axial displacement using a screw thread is admittedly very suitable when it comes to producing the desired fine adjustment of the sensor, but however there is no way of producing a coarse adjustment quickly. Frequently, the proximity sensor has to be revolved a large number of times before it is in its desired position so that the fitting operation becomes involved, tedious and time-consuming. Furthermore the locking of the proximity sensor in place with the lock nut is apt to be problematical. Such a nut only acts on a very small part of the circumference in relation to the axial length of the proximity sensor so that the resulting gripping forces act more or less at one small point or range and this is likely to cause a local deformation of the proximity sensor. This may lead to trouble conditions, which may make themselves felt in anything ranging from a misalinement of the switching point to complete failure of the proximity sensor. A further point is that on fixing a proximity sensor in place careful attention must always be paid to not exceeding the permissible torque for tightening up the lock nut to make certain that the detector elements are not damaged. The direct mounting of a cylindrical proximity sensor in a threaded hole is therefore frequently more troublesome than one would expect at first sight.

SHORT OVERVIEW OF THE INVENTION

One object of the present invention is to design a proximity sensor that takes care of these shortcomings.

A further aim of the invention it to provide a proximity sensor mount of the sort noted, in which the sensor is acted upon by a forces distributed over a wide area when it is lock in its final setting so that there is no malfunction of the sensor and assembly is simplified.

A still further purpose of the invention is to make it possible for the sensor to be coarsely set quickly.

In order to attain these and further objects, a mount for a proximity sensor with a cylindrical housing, whose outer face bears a male thread, is characterized by a mount fitting made up of gripping jaws with a lengthways-slitted bush therebetween, into which the proximity sensor may be screwed.

The use of the sleeve or bush with the slit running along it makes it possible for the gripping force of the jaws to be evenly distributed along and around the outer face of the proximity sensor. By displacing the bush between the gripping jaws it is possible to adjust the sensor coarsely, while by screwing the proximity sensor backwards and forwards in the jaws it is possible to adjust it finely. When the proximity sensor has been moved into its set position, the gripping jaws are tightened so that the sensor is firmly locked in place.

As part of a further development of the invention, the gripping jaws are adapted to be moved towards and away from each other in a direction normal to the length direction of the bush, that is generally cylindrical and is received in segment-like recesses in the jaws, such recesses subtending angles of less than 180° around the cylinder. This makes the structure of the mount very simple and easily produced at a low price.

As a further outgrowth of the main idea of the invention the gripping jaws have a rectangular form in plan and are able to be adjusted in relation to each other by two diagonally placed tightening screws, the corners of the jaws not occupied by the screws forming a mounting point for the mount, at least one of the gripping jaws having one or more mounting holes countersunk into the side turned towards the parting plane of the gripping jaws. This makes the mount very compact inasfar as the space is used in the best possible way for mounting screws.

It is furthermore possible for there to be a lock nut that screws onto the housing of the proximity sensor and acts against the bush, this being a simple way of locking the sensor in its desired position in the mount.

The bush may have a male thread thereon for cooperation with a mating thread in the recesses of the gripping jaws and at its end it may have a head formed for use with a screwing tool. This makes possible a coarse adjustment of the proximity sensor between positions representing steps in the setting of the sensor. Furthermore one may be certain that the bush is always satisfactorily centered between the gripping jaws.

In accordance with a still further possible design of the mount of the invention, at least one of the gripping jaws has a guide structure, running normal to the length direction of the bush or sleeve, such structure being for example in the form of a groove, trough or the like.

This form of the invention is particularly well suited for a mount that is to be fixed in an external unit. The guide structure makes possible an adjustment of the mount without affecting the set switching point of the proximity sensor.

A more detailed account will now be given of the invention with reference to only one possible form thereof to be seen in the figures.

LIST OF THE SEVERAL VIEWS OF THE FIGURES

DETAILED ACCOUNT OF WORKING EXAMPLE OF THE INVENTION

Figure 1:
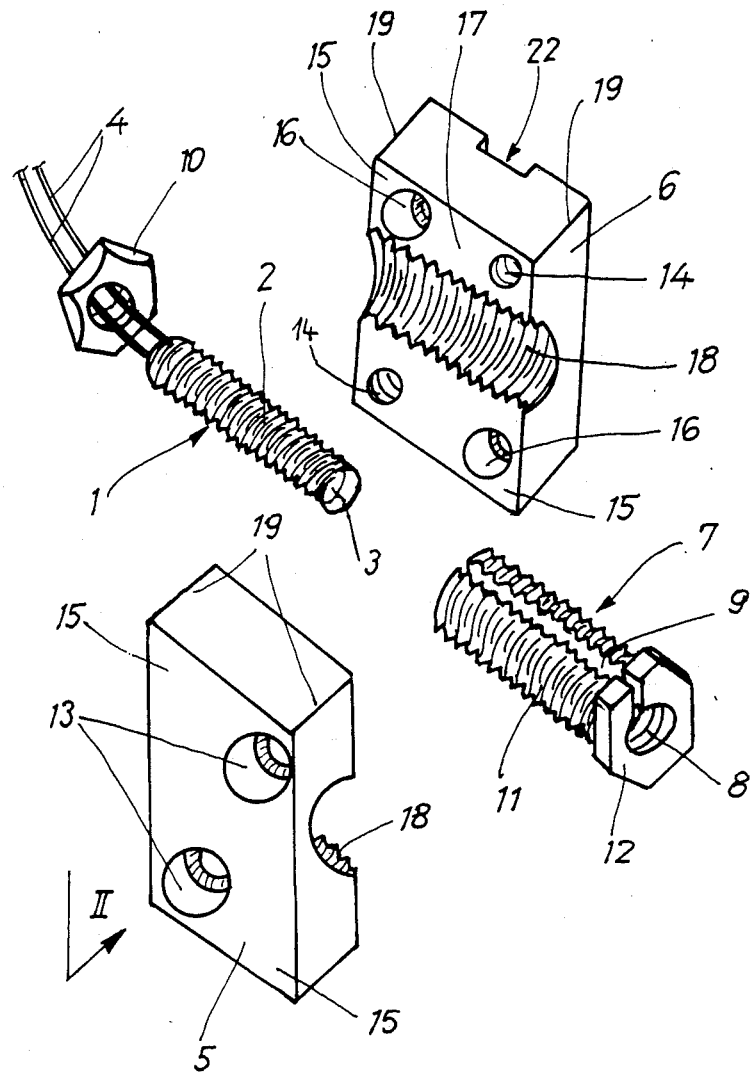
FIG. 1 is an exploded view of a mount with its proximity sensor.

Referring firstly to FIG. 1, the reader will be able to see a proximity sensor 1 to be mounted, for example of the inductive switch type. The proximity sensor 1 has a cylindrical housing 2, that has a male thread on its outer face. The detector element 3 of the proximity sensor is at one end thereof so that it is somewhat set back within the end. This makes certain that here is always a clearance in front of the detector element 3 which is beneficial inasfar as the element is then kept out of the way of metallic objects which would otherwise misaline the characteristics of the sensor 1. However it would furthermore be possible to have a proximity switch ending flush with the end of the sensor. A connection cable 4 runs out of the opposite end of the housing 2, such cable serving for the supply of power to the proximity sensor 1 and/or as signal connections.

The proximity sensor 1 may be used to detect objects, that are near the proximity sensor 1 in front of the detection element 3. The inductive proximity sensor 1, that is only to be considered as one possible example, is more specially responsive to metal bodies. Within the housing 2 there is an oscillator, that produces an electromagnetic field. This is radiated more or less normally to the surface of the detection element 3 thereby. In the event of a metallic body coming within the range of the detector element 3, the electrical field from the detector element is damped by the metal with the production of eddy currents therein. This damping may be discriminated by the increased absorption of energy by the oscillator, the proximity sensor 1 then producing an output signal.

The invention provides a mount for the proximity sensor 1, that is made up of two gripping jaws 5 and 6 and a bush 7 that may be gripped therebetween. The bush 7 has an axial hole 8 therein running from end to end and into which the proximity sensor 1 is screwed with its male thread. Furthermore the bush 7 is slitted along it full length, such slit being marked 9 in FIG. 1. To fix the proximity sensor 1 in place the bush 7 with the proximity sensor already screwed into it is placed between the gripping jaws 5 and 6. The same are then drawn together so that the bush 7 is able to be compressed because of the presence of the slit. The proximity sensor 1 is therefore clamped in the bush 7, the pressing force being over a large area rather than at a limited point of contact.

The length of the bush 7 is preferably somewhat shorter than the length of the proximity sensor 1 so that the latter always projects to some degree out of the bush 7, even after it has been fully screwed into the female-threaded hole. It is possible for a lock nut 10 to be screwed onto the opposite end of the proximity sensor 1, the female thread of the nut matching the outer thread of the proximity sensor 1. The lock nut 10 acts against the end of the bush 7. It may be used to lock the proximity sensor 1 in a given position of screwing inside the bush 7. To this end only a very small tightening torque on the lock nut 10 will be needed, that avoids any danger of damage to the proximity sensor 1. The tightening up of the proximity sensor 1 is to a far greater extent undertaken by the tightening up of the gripping jaws 5 and 6.

In the present working example of the invention the bush 7 has the form of a screw with a threaded shank 11 and with a screw head 12 at one end thereof. It has the threaded hole 8 running through it from one end to the other. The slit 9 runs along the shank 11 and the head 12 of the bush so as to divide its wall. The gripping jaws 5 and 6 are designed to fit round the threaded shank 11 of the bush 7. To this end they have recesses with a complementary female thread, in which the bush 7 may be moved only in steps when the jaws are opened and in which the bush 7 may be screwed along when the gripping jaws are gently closed onto it.

FIG. 1 shows a mount in detail having two gripping jaws 5 and 6 that may be adjusted in a direction normal to the length direction of the bush 7, that is to say towards and away from each other. The jaws 5 and 6 have a rectangular plan or outline. They are tightened up towards each other by two diagonally placed gripping screws; it will be seen that on the one gripping jaw 5 there are two through holes 13 taking up the gripping screws and on the other jaw 6 there are two screw holes 14 alined therewith. The through holes 13 are countersunk into the outer side of the gripping jaw 5 so that the head of the screw is under the level of the surface.

The corners 15 of the gripping jaws 5 and 6 not occupied by the screws may best be designed as mounting points for the mount of the invention. In the present working example thereof the gripping jaw 6 having the threaded holes 14 is furthermore designed with two holes 16, into which mounting screws may be placed. The holes 16 are countersunk out of the side 17 facing the parting plane of the gripping jaws 5 and 6 so that the heads of mounting screws will be under the level of the gripping jaw 6. The mounting screws are placed in the holes 16 before the gripping jaws 5 and 6 are closed. Because of the countersunk placing of the mounting screws, the jaws may be moved towards each other without anything in their way. The corners opposite to the holes 16 for the mounting screws of the other gripping jaw 5 are in the present working example of the invention made solid.

When the gripping jaws 5 and 6 are fastened the mounting screws will for this reason be locked in the holes 16 without any chance of their being lost and the heads of the mounting screws is not accessible from the outside.

In cross section the gripping jaws 5 and 6 each have a circular segment-like recess 18, that subtends an angle on the circumference of less that 180°. The recess 18 corresponds in its diameter to a generally cylindrical part of the bush 7, that in the present working example is formed by the threaded shank 11. To interlockingly receive the bush 6 the recesses are made with female threads matching the screw thread on the bush. The gripping jaws 5 and 6 may be shut onto the threaded shank 11 the screw thread then fitting into the female thread of the recesses 18. In this position in the present example of the invention the edges 19 on the narrow sides of the gripping jaws 5 and 6 are alined with each other and between the gripping jaws 5 and 6 there is a joint gap that makes it possible for the bush 7 to be pressed to a greater or lesser degree by tightening the gripping screws. If the force thereon is only small, the bush 7 may be screwed along in the female thread of the recesses and when the pressing force is stronger the bush 7 with the proximity sensor within it will be locked between the gripping jaws.

The gripping jaws 5 and 6 to be seen in FIG. 1 may be prduced quite simply by first making a rectangular block with a central through hole parallel to the side edges, the thread in the hole tallying with the male thread on the bush 7. The block is then cut into two pieces along its central plane, that is to say along a diameter of the threaded hole and the parting faces are machined to be plane. If desired the thread will be precision-finished. The gripping jaws 5 and 6 so produced will match each other exactly and the joint gap therebetween will give enough play for the gripping jaws 5 and 6 to be tightened.

Figure 2:
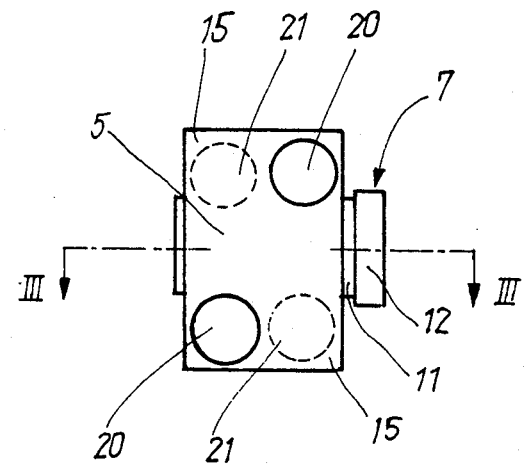
FIG. 2 is a a plan view of the mount in the fastened position looking in the direction II as marked in FIG. 1.
Figure 3:
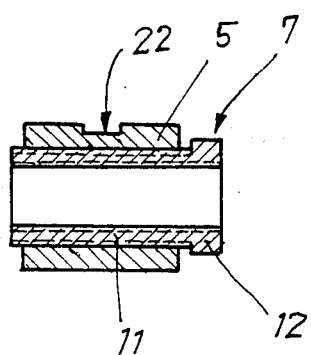
FIG. 3 shows a section through the mount taken on the line III—III of FIG. 2.

As may be more specially seen from FIG. 2, the gripping jaws 5 and 6 have a length in the direction of the sleeve 7, that is somewhat less than the length of the threaded shank 11. The figure furthermore shows diagrammatically the gripping screws 20, by way of which the gripping jaws 5 and 6 are screwed to each other, and the covered mounting screws 21, that are used to fix the mount of the invention to some assembly.

The bush 7 may be moved in steps between the opened gripping jaws 5 and 6 in the length direction, the distance between the separate steps being exactly equal to the height of the thread on the threaded shank 11 and the recesses 18. This provides a simple and convenient way of coarsely adjusting the proximity sensor 1. Once the coarse adjustment has been made, the gripping jaws are closed somewhat so that the bush 7 may still be screwed in the recesses 18. By screwing the bush 7 along the fine adjustment of the proximity sensor 1 may be carried out, it being best to use a screwdriver acting on the screw head 12 of the bush 7. Lastly the gripping screws 5 and 6 are tightened up.

The gripping jaws 5 and 6 may be designed with suitable guiding structures, as for example in the form of a groove 22, a trough or a molded on rail or the like for alining and fixing the mount of the present invention. In the present working example there is a groove 22 formed in the gripping jaw 6 that has the holes 16 for the mounting screws 21. This groove is located on the outer side of the gripping jaw 6, that is turned away from the parting plane of the gripping jaws and it stretches along at a right angle to the length direction of the bush 7 for the full height of the gripping jaw 6. The groove 22 has a rectangular outline and is desiged to receive a mating guide rib, on which the gripping jaw is alined before is its pre-assembled using the mounting screws 21.

The mount of the present invention is preferably used for proximity sensors 1, as are used in the control of the movement of hydraulic or pneumatic piston-cylinder actuators. The described form of the gripping jaws 5 and 6 is specially suited to employment with such assemblies.

I claim:

1. A mounting for proximity sensors comprising a circularly cylindrical sensor housing having a surface which has an external thread, a bush split along its entire length and having an externally threaded surface and a threaded bore into which the proximity sensor housing is screwed, a clamping jaw structure comprising a pair of seperable clamping jaws and defining a clamping jaw threaded recess therebetween, said bush being displaceable in the threaded clamping jaw recess in a longitudinal direction for adjusting the proximity sensor housing.

2. The mount as claimed in claim 1 having two such gripping jaws that are adapted to be moved towards each other in a direction normal to the length direction of said bush.

3. The mount as claimed in claim 2 wherein said bush is generally cylindrical and said gripping jaws each have a part cylindrical recess therein to receive said bush, said recesses subtending angles of less than 180°.

4. The mount as claimed in claim 1 wherein said gripping jaws are of a rectangular form in plane and comprise two diagonally placed gripping screws for drawing them together and for adjustment, corners of said jaws free of said screws being designed as mounting points for said mount.

5. The mount as claimed in claim 4 characterized in that at least one of the gripping jaws has at least one countersunk hole in a side thereof facing a space between the jaws.

6. The mount as claimed in claim 1 comprising a lock nut screwed onto the thread on the sensor and acting against the bush.

7. The mount as claimed in claim 1 wherein said bush and said recesses of said gripping jaws have complementary male and female threads.

8. The mount as claimed in claim 7 wherein the bush has an end adapted for use with a screwing tool.

9. The mount as claimed in claim 1 wherein at least one of the gripping jaws has a locking structure running in a direction normal to the length direction of the bush.

10. The mount as claimed in claim 9 wherein said structure is in the form of a groove.

* * * * *